United States Patent [19]

Rauscher et al.

[11] 3,754,845
[45] Aug. 28, 1973

[54] APPARATUS FOR SPLICING JACKETED CABLE

[75] Inventors: David Albert Rauscher, Columbia, S.C.; Robert Warren Alexander, Fort Lee, N.J.

[73] Assignee: Carolina Steel and Wire Corporation, Lexington, S.C.

[22] Filed: June 30, 1972

[21] Appl. No.: 268,115

Related U.S. Application Data

[62] Division of Ser. No. 158,482, June 30, 1971, Pat. No. 3,721,277.

[52] U.S. Cl.................. 425/111, 425/108, 425/116, 425/129, 425/812, 425/127
[51] Int. Cl....................... G29c 27/14, B29c 27/30
[58] Field of Search..................... 29/239, 240, 460, 29/461; 174/90; 264/262, 272; 425/108, 129, 127, 111, 123, 116, 812

[56] References Cited
UNITED STATES PATENTS

| 2,716,623 | 8/1955 | Tator | 249/95 |
| 2,197,465 | 4/1940 | Brunetti | 425/111 X |
| 3,475,529 | 10/1969 | Lacy | 425/111 X |

Primary Examiner—Robert L. Spicer, Jr.
Attorney—Thomas B. Van Poole, Nathaniel A. Humphries et al.

[57] ABSTRACT

A method of splicing cable encased in a plastic jacket is disclosed in which the jacket is removed for a given distance inwardly from the ends of the cable to be spliced, the strands are cut and interleaved to provide a mechanical splice portion which is then inserted in a mold and heated to a high temperature, liquid plastic at a high temperature is then injected in the mold to flow into the intestices of the splice and the space surrounding the splice and the mold is then cooled to provide a completely jacketed splice; another aspect of the invention resides in the mold construction in which an inlet is provided centrally of an elongated hollow cylindrical mold with outlets being provided adjacent each end of the mold adjacent the ends of the cable splice so that hot plastic injected into the mold flows outwardly to expel all air in the mold and to consequently provide a more uniform jacket over the splice.

10 Claims, 13 Drawing Figures

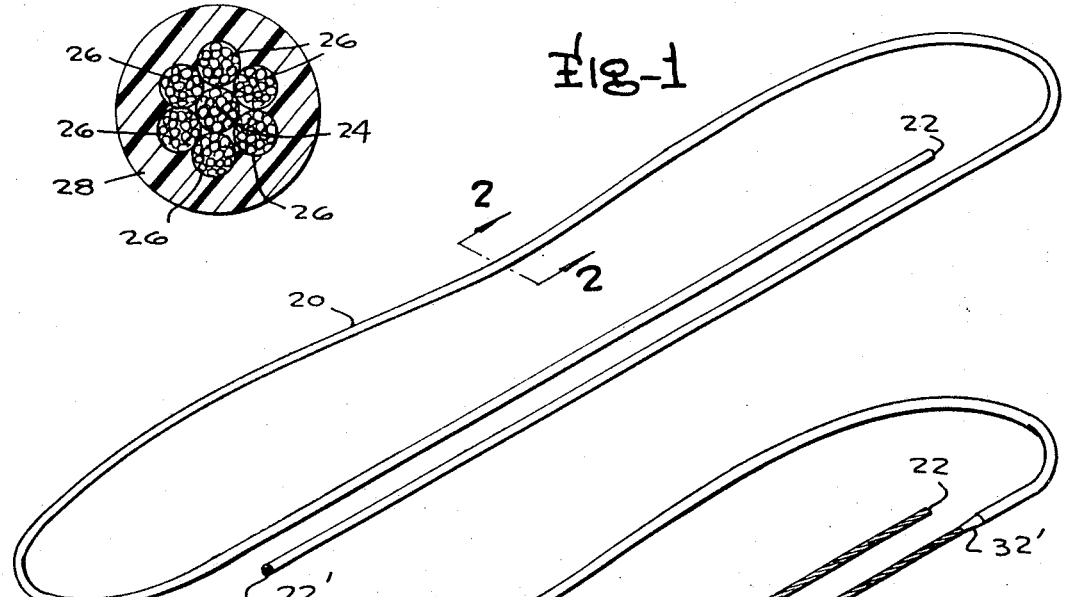

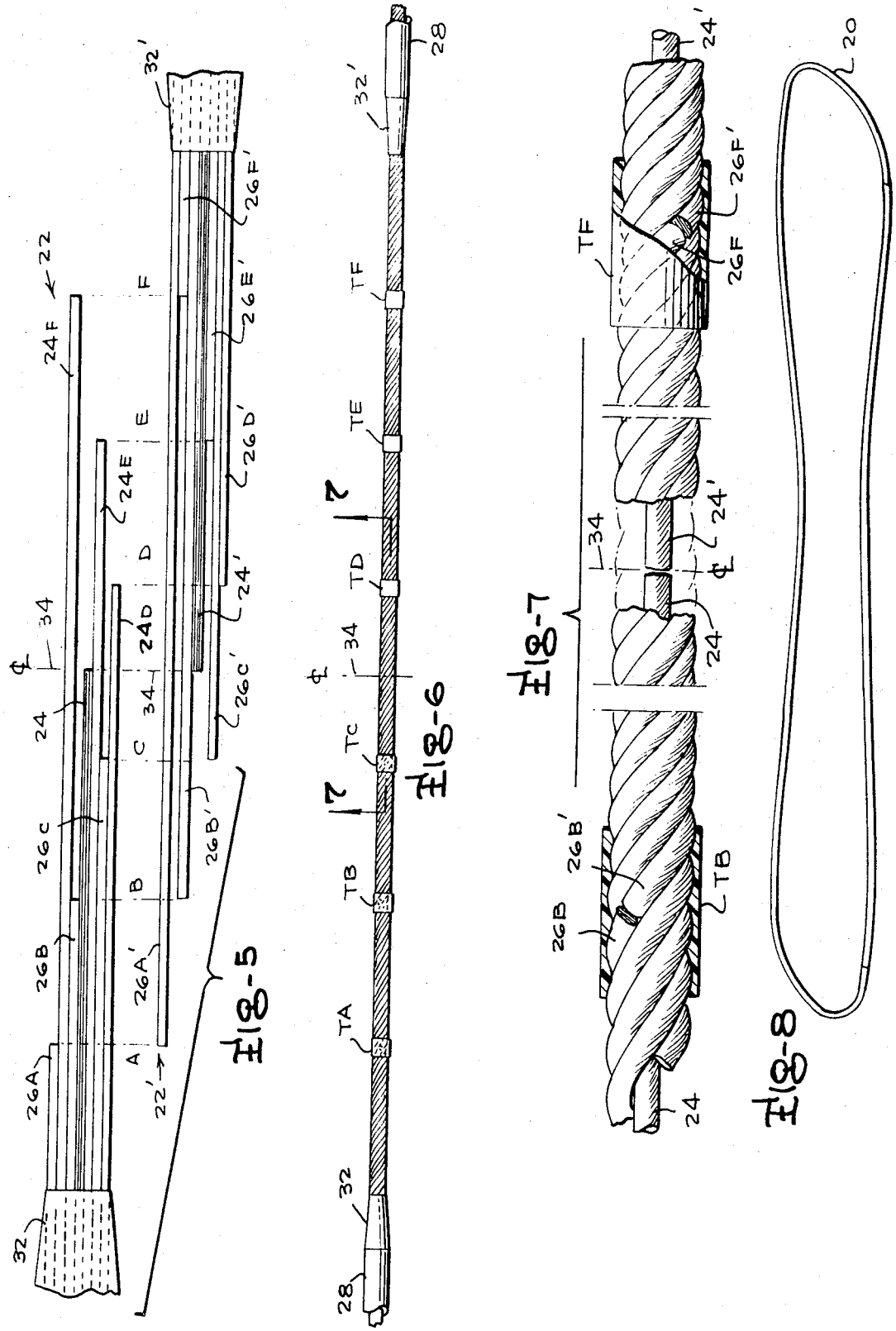

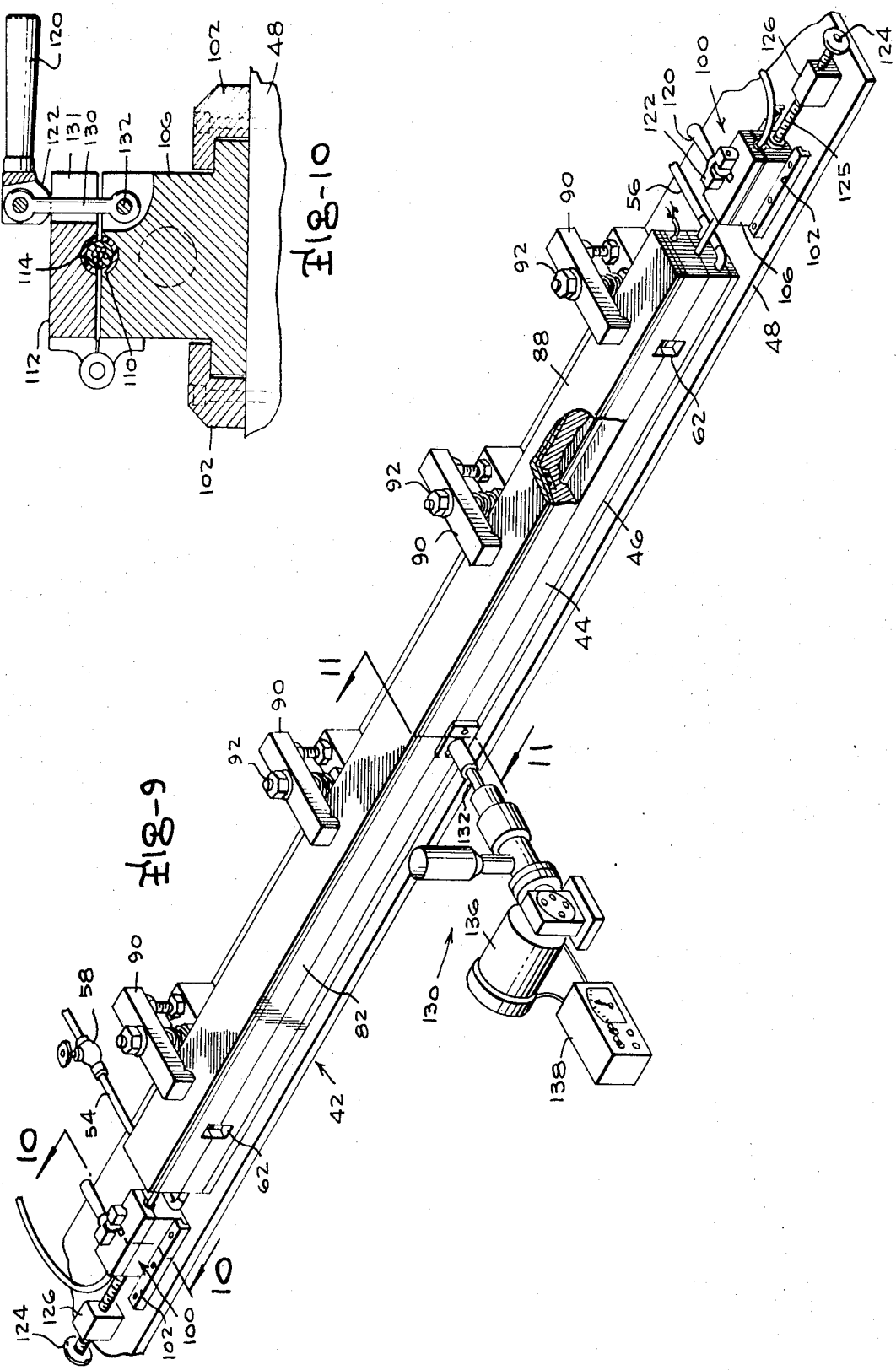

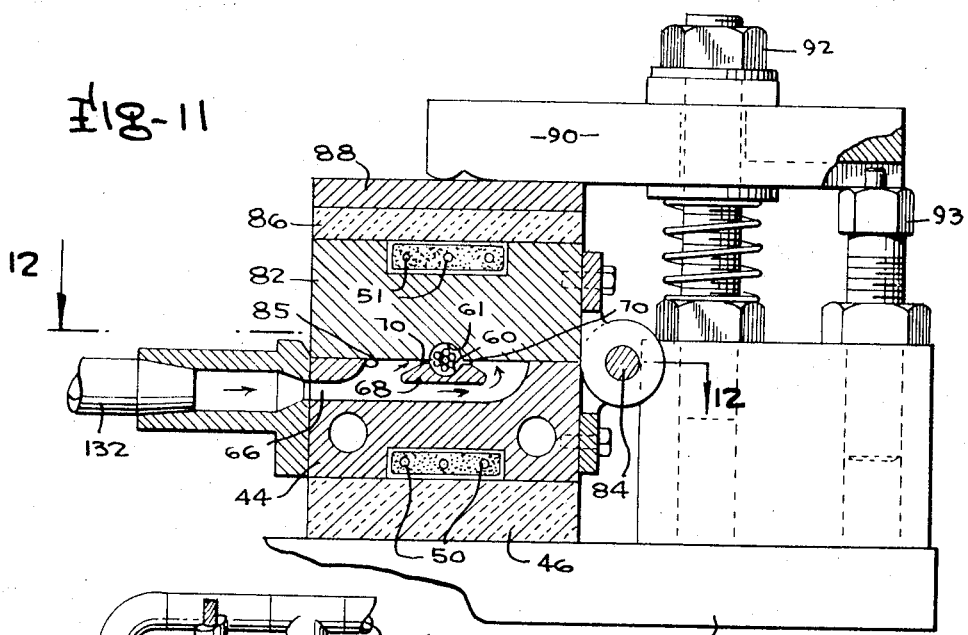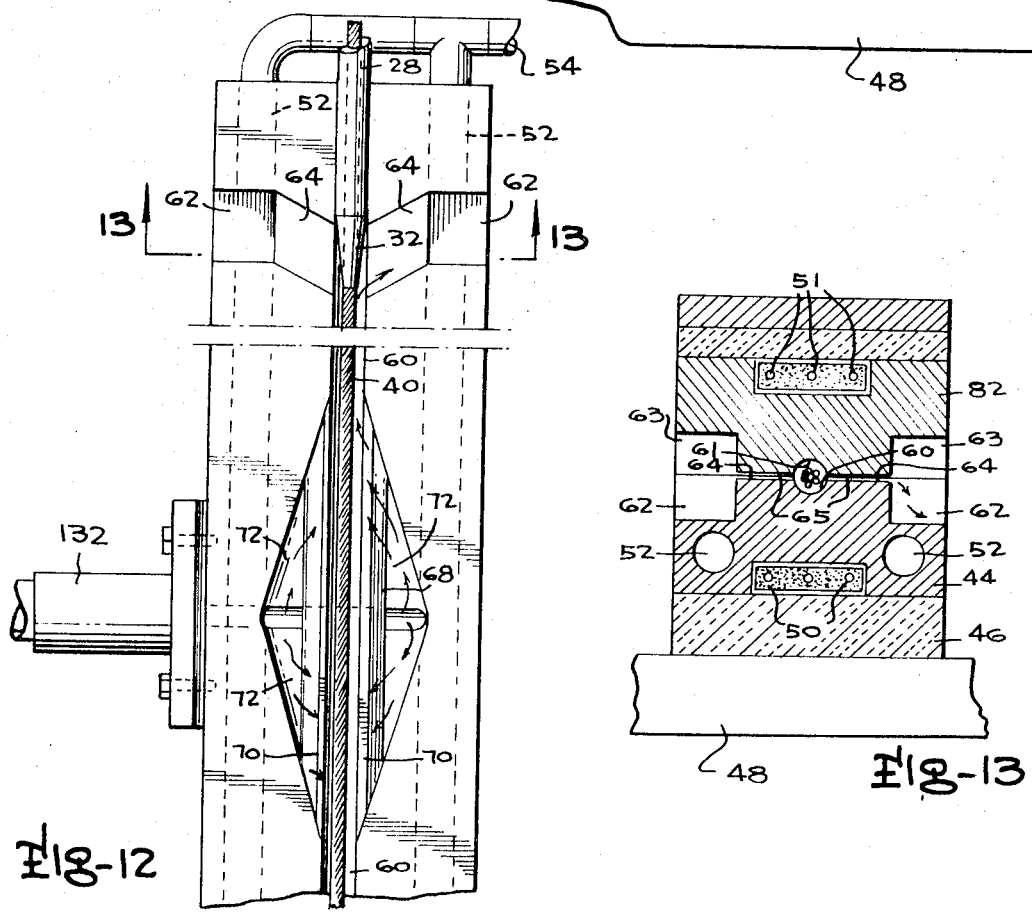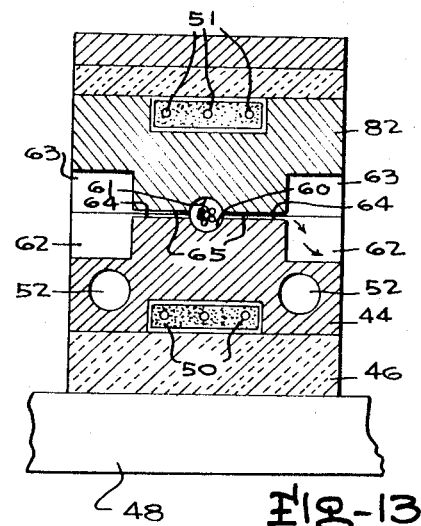

APPARATUS FOR SPLICING JACKETED CABLE

This invention is in the field of cable splicing methods and apparatus for enabling the splicing of jacketed cable. More specifically, the invention is directed to a method and apparatus for enabling the splicing of cable of the type formed of an inner wire cable portion encased in a jacket of plastic or the like.

Jacketed cable of the type employing a plastic jacket such as nylon or similar material encasing a stranded wire cable has long been used for a variety of purposes with one of the primary uses for such cable being in the field of conveyors employed for conveying cans or the like in canneries, for example. Such conveyor cable must be in the form of a continuous loop which is formed by splicing two free ends of a single piece of cable together to provide the complete loop construction. In addition, such cable occasionally fails or is damaged so as to require repair involving the splicing of ends of the cable. It is quite desirable that the splice have substantially the same strength as the original cable section and that the jacket coating be reapplied to provide a uniformly smooth and durable surface. Unfortunately, neither of these results has been fully achieved by the prior expedients employed in the splicing of such jacketed cables.

Probably the most widely used prior known method of splicing jacketed cable consists of initially removing the jacket from the ends of the cable to be spliced followed by hand-tucking of cable strand ends into a mechanical splice by the employment of a marlin spike. A nylon tube of cylindrical configuration having a slit along its length is then positioned over the mechanical splice and the entire splice is then placed in a heat mold. The temperature in the heat mold is increased so that the split nylon tubing melts to hopefully provide adhesion to the cable and to the ends of the cable jacket. Unfortunately, this procedure requires a substantial amount of time and frequently a single splice may require at least two and one-half hours or more to complete. In addition, this method of providing a splice is frequently unsatisfactory due to the fact that there is a substantial amount of air trapped in the spliced portion and the nylon jacket consequently fails to properly adhere to the cable or to the jacket ends. Moreover, the presence of the air bubbles in the nylon portion results in a substantial weakening of the cable splice so as to frequently lead to an early failure of the splice. The substantial defects of the aforementioned method of splicing previously employed have resulted in a 50 percent failure rate for such splices. Consequently, a great loss of time and labor is required for resplicing the cable.

Therefore, there has been a distinct need for a cable splicing method which would have the capability of rapidly splicing plastic jacketed wire cable to provide an effective and strong splice on all occasions. In addition, there has also been an unmet need for a cable splicing system which would provide a jacket construction substantially free of air bubbles to provide an effective and permanent bond to the strand components of the cable as well as the cable jacket.

Consequently, it is the primary object of this invention to provide a new and improved method and apparatus for splicing plastic jacketed cable members.

Obtainment of the object of this invention is enabled through the provision of a method and apparatus in which the cable ends are initially stripped back a given distance with the wire strands then being cut and interleaved in a known manner to provide a mechanical splice of the wire strand components. The spliced portion is then placed in a hollow mold member, the cable is tensioned and the mold member is heated to approximately 500°F. Vents are provided adjacent each end of the mold member and an injection opening is provided centrally of the mold member into which hot melted plastic is injected to flow into the interior of the mold under substantial pressure. The plastic is forced into the interstices of the cable and even into the minute voids between the wires in the outer strands, with pentration to the center core strand, thus more than filling the void created by the removal of the original extruded jacket portions. Following filling of the mold chamber, the chamber is rapidly cooled by water injected in the passageways in the mold and the cable is removed from the mold so that the splice is completed. The injected plastic replaces the originally removed jacket portions and is permanently bonded to the ends of the original jacket portions along with the wire strand components of the cable. Consequently, a strong and reliable bond is effected between the injected plastic and the cable components.

The manner in which the object of this invention is enabled will be more completely understood when the following written description is considered in conjunction with the attached drawings in which:

FIG. 1 is a perspective view of a length of cable to be spliced;

FIG. 2 is a sectional view taken along lines 2—2 of FIG. 1;

FIG. 3 is a perspective view of the cable illustrating an initial step in effecting the splice of the cable ends;

FIG. 4 is a perspective view illustrating a subsequent step in the splicing of the cable ends;

FIG. 5 is a diagrammatic plan view illustrating the manner in which the cable strands are cut prior to being mechanically spliced together;

FIG. 6 is a plan view illustrating the cable strands mechanically spliced together as a subsequent step in the splicing operation;

FIG. 7 is an enlarged view of a section of cable illustrating portions of the splice;

FIG. 8 is a perspective view of the finished splice;

FIG. 9 is perspective view of injection mold apparatus employed in providing a new jacket over the spliced strand portion of the two cable ends;

FIG. 10 is a sectional view taken along lines 10—18of FIG. 9;

FIG. 11 is a sectional view taken along lines 11—11 of FIG. 9;

FIG. 12 is a sectional view taken along lines 12—12 of FIG. 11; and

FIG. 13 is a sectional view taken along lines 13—13 of FIG. 12.

Attention is initially invited to FIG. 1 of the drawings which illustrates a length of cable 20 having first and second ends 22 and 22' which are to be connected by the inventive method to provide a closed loop as shown in FIG. 8 of the drawings. Cable 20 comprises an inner core strand 24 formed of a plurality of individual wires and a plurality of outside strands 26, with all of the strands being formed of individual wire members and the outside strands 26 being spirally wound about the inner core strand 24. All of the strands are surrounded by a jacket 28 formed of plastic or the like.

As an initial step toward providing the unitary cable loop of FIG. 8, the end portions of the plastic jacket are removed for a predetermined distance from each of the ends of the cable to leave first and second bare cable portions 30 and 30' as shown in FIG. 3. The ends of the jacket adjacent the bare cable portions 30 and 30' are tapered downwardly to the cable in areas 32 and 32' by a conventional pencil taper stripping tool.

The bare cable portions 30 and 30' are each equal to the length of the splice section to be formed. The midpoint of the splice section comprises a center line 34 as shown in FIG. 4, 5 and 6. It should be noted that the bare cable portions 30, 30' initially overlies each other so that the ends 22 and 22' are respectively spaced a given distance from the center line on opposite sides of the center line.

Each of the outer strands 26 are individually unwrapped from the center core of cable ends 22 and 22' with the first outer strand 26A (FIG. 5) being cut at location A a given distance from the center line 34 and the cut end of the strand is discarded. A strand 26A' of end 22' is also cut along location line A and the cut end of the strand is discarded; the strand 26A' is then wound into the spiral slot on end 22 formerly occupied by the discarded cut end portion of strand 26A as shown in FIG. 4.

Similarly, a second strand 26B of end 22 is cut at location line B and the portion of the strand to the right of line C as viewed in FIG. 5 is discarded. An outer strand 26B' of end 22' is also cut at line C with the portion of strand 26B' to the left of line C being discarded; the remaining portion of strand 26B is wound into the space formerly occupied by the discarded portion of strand 26B so that the ends of strands 26B and 26B' are in spaced facing relationship approaching an abutting relationship.

Strand 26C of end 22 is cut along line C and strand 26C' is similarly cut and placed in the space formerly occupied by that portion of strand 26C to the right of line C.

In like manner, strands 24D and 24D' are cut on position line D with strand 24D being wound into the space previously occupied by that portion of strand 24D to the left of position line D. Similarly, strands 24E' and 24E are cut and wound into end facing positions at position E and strands 24F and 24F' (see FIG. 4) are similarly cut and positioned in interleaving end facing relationship to provide a complete mechanical splice. Center core strands 24 and 24' of each end are then cut at center line 34 and placed in end facing aligned relationship as shown in FIG. 5.

The facing ends of strands 26A and 26A' are held in position by a small piece of cellophane or other transparent tape TA such as the tape marketed by the Minnesota Mining and Manufacturing Company under the trademark SCOTCH. Similarly, the facing ends of strands 26B and 26B' are held in position by tape TB (FIG.7) while strands 26C and 26C' are held in position by tape TC. In like manner, the ends of strands 24D and 24D' are held in position by tape TD; the ends of strands 24E and 24E' are held in position by tape TE; and the ends of strands 24F and 24F' are maintained and held in position by a piece of tape TF as clearly shown in FIG. 7 of the drawings.

The mechanical splice of the stranded cable components is completed following completion of the foregoing steps, and a bare spliced cable section 40 extends between tapered jacket end surfaces 32 and 32' and is ready to receive a replacement jacket portion in place of the jacket portions removed prior to the mechanical splicing of the cable strands.

A mold member 42 perspectively illustrated in FIG. 9 is provided for enabling the rejacketing of the bare cable splice section 40. Mold member 42 includes a base block 44 (FIG. 11) mounted upon a layer of insulating material 46 which is in turn supported upon a support plate 48 such as a work table or the like.

Base block 44 includes a plurality of electrical heating elements in the form of conductors 50 mounted in the lower portion of the base block and is also provided with a pair of cooling water conduits 52 extending along the length of the base block with the ends of the conduits 52 as viewed to the left in FIG. 9 being connected to a water inlet line 54 and the other ends of the cooling water conduit being connected to a water outlet discharge line 56. A valve 58 is provided in the inlet line in a known manner for controlling the water supplied to the conduits 52.

A semi-circular groove 60 (FIGS. 11,12 and 13) extends downwardly in the upper surface of the base block 44 and has a diameter substantially equal to the diameter of the jacketed cable 20.

A pair of bleed notches 62 are provided on the upper side edge surface at each end of the base block 44 as shown in FIGS. 9 and 13. While FIG. 9 only illustrates two of the bleed notches, it should be understood that there are two other aligned notches on the other side of the member 44 not visible in FIG. 9. In addition, a relatively shallow slot 64 (FIG.12 and 13) extends inwardly from each of the bleed notches 62 to provide external communication with the semicircular groove 60. The juncture of the shallow slot 64 and the semicircular groove 60 on each end of the block 44 are spaced apart a distance equal to the spacing between the tapered pencil surface 32 and 32' of the cable following completion of the splicing operation.

In addition, the base block member 44 is also provided with an inlet aperture 66 at its axial center which extends inwardly beneath a bridge portion 68 of block 44 (FIG.11). The upper surface of the bridge portion 68 includes a portion of the semi-circular groove 60 with the upper surface of the bridge portion 68 also being recessed downwardly a small amount defined by upper surfaces 70. The surfaces 70 communicate with a triangular recess 72 on each side of the bridge member with the inlet aperture 66 communicating with both of the triangular recesses 72 so that liquid plastic can move inwardly through aperture 66 to flow into both sides of the semi-circular slot 60 in a manner to be discussed in detail hereinafter.

A pivotal top block 82 is hingedly connected to the base block 44 for pivotal movement about a pivot shaft 84. The lower surface 85 of the top block 82 is provided with an upwardly extending semi-circular groove 61 which is in aligned facing relationship with respect to the groove 60 so that the two semi-circular grooves in effect provide a cylindrical cavity extending along the length of the mold member. This cylindrical cavity is of a diameter substantially equal the diameter of the cable 20.

Top block 82 also includes electrical heating conductors 51 mounted in its top surface and a layer of insulating material 86 is provided to overlie the upper surface of the block 82. A protective steel plate 88 overlies the insulating material 86 and inwardly extending bleed notches 63 formed in the lower surface of block 82 are positioned above and in alignment with the bleed notches 64 of the base block 44; similarly, shallow slots 65 extend upwardly from the lower surface of the block 82 in aligned relationship to the slots 64. Therefore, the slot 64, 65 and notches 62, 63 provide acess between the inner cavity defined by semi-circular grooves 60 and 61 and the exterior of the mold member.

Top block 82 can be held in position over the base block 44 as shown in FIG. 11 by means of a plurality of conventional clamp bars 90 which can be adjusted to vary the force with which the top block 82 is urged downwardly toward the base block 84 in an obvious manner. However, the clamp bars 90 can be removed by the loosening of adjustable members 92, 93 to enable the top block 82 to be pivoted about the pivot shaft 84 to enable access to the interior of the mold member.

An adjustable cable clamp 100 is mounted for axial reciprocation between guide lugs 102 on the support plate adjacent each end of mold 42. Each of the cable clamps 100 includes a slide pillow block 106 engageable with lugs 102 as shown in FIG. 10 and having a semi-circular slot of friction material 110 formed in its upper surface. A pivotal clamp plate 112 is hingely connected to the slide pillow block 106 and includes a semi-circular cushioned groove 114 aligned with groove 110. The pivotal clamp plate 112 is pressed downwardly towards slide pillow block 106 by means of a clamp arm 120 having eccentric cams 122 engageable with the upper surface of pivotal clamp plate 112. Arm 120 is pivotally connected to the upper end of a link 130 which is positioned in an edge slot 131 in clamp plate 112 with the lower end of the line being pivotally connected at 132 to the slide pillow block 106. Consequently, rotation of the arm 120 in a clockwise direction as viewed in FIG. 10 results in the downward clamping movement of the top pivotal clamp plate 112 towards the slide pillow block 106 for clamping a cable positioned in the grooves 110, 114. Pillow slide blocks 106 are adjusted toward and away from each other by operation of knobs 124 on threaded rods 125 extending through threaded apertures in lug blocks 126 to support 48. Adjustment of blocks 106 tensions and positions the cable held by the cable clamps in an obvious manner.

Following completion of the splicing of the cable strands, the pivotal clamp plate 112 of each of the clamps 100 is opened with respect to the pillow block 106 and the top block 82 is opened with respect to the base block 44. The bare spliced section 40 is then positioned in the mold groove defined by the semi-circular grooves 60, 61 and in the semi-circular grooves 110 of clamps 100. The top block 82 is then closed and clamped downwardly by the clamp bars 90; pivotal clamp plate 112 of each of the cable clamps 100 is also closed and clamped downwardly by actuating the clamp arm 120 to clampingly engage each end of the cable exteriorly of the mold member. The adjustment knobs 124 are then actuated to tension and position the cable so that it extends axially along the length of the cylindrical mold opening defined by the semi-circular slot 60,61.

An extruder generally designated 130 of conventional construction is provided adjacent the inlet aperture 66 and has its outlet connected by a conduit 132 to the inlet aperture 66. Extruder 130 includes a plastic supply hopper in which nylon pellets or thelike are provided, a drive motor 136 and a heating unit controlled by a control unit 138. Therefore, during operation of the extruder 130, a continuous supply of high pressure melted plastic is provided to the conduit 132.

Following positioning and tensioning of the bare cable splice section 40 in the mold member 42, the electrical heating unit wires 50, 51 are connected to a source of voltage so that the mold is heated to a temperature of approximately 500°F. The heating element wires 50,51 are positioned so that the jacket portion adjacent each end of the mold member outwardly of the tapered portions 32, 32' does not receive an over abundance of heat so as to be melted. However, the portions of the cable inwardly of the tapered sections 32, 32' are heated to approximately 500° which is substantially above the melting point of the nylon supplied by the extruder 130.

The extruder 130 is actuated after the mold has reached the desired temperature of approximately 500° F and high pressure melted plastic is injected by the conduit 132 into the inlet 66. The melted plastic flows inwardly in the direction of the arrows shown in FIGS. 11 and 12 to enter the cylindrical chamber defined by semi-circular slots 60, 61 and spreads outwardly along a substantial length of the mold member as shown in FIG. 12 to provide entry to the area surrounding the bare cable section 40 in an obvious manner. The melted plastic flows outwardly from inlet 66 with any air in advance of the plastic being ejected from the mold chambers out through the shallow slots 64, 65 and the bleed notches 62, 63 in an obvious manner. The melted plastic merges with the surfaces 32, 32' to provide a continuous surface and the extruder 130 is turned off as soon as it is obvious that the entire length of bare cable splice 40 has received all possible plastic as evidenced by the extrusion of plastic outwardly through the shallow slots 64, 65.

A very important feature of the subject invention resides in the fact that the lead slots 64, 65 are quite shallow so that there is a substantial resistance to the extrusion of plastic from the slot and a high pressure consequently builds up in the area surrounding the cable in the cylindrical mold opening defined by the semi-circular grooves 60, 61. This high pressure causes the liquid plastic to flow into the pores and openings of the metal cable member per se to fill all available openings and provide a complete bond between the plastic and the cable. The high temperatures employed completely melt the tape portions TA etc.so that they do not impede plastic flow to the center of the cable. This fact provides an extremely durable and strong connection in the splice area.

Following injection of the plastic into the mold, the extruder is then turned off and cooling water is injected via line 54. The mold is rapidly cooled and the cable can then be removed and flashing formed by slots 64, 65 trimmed in an obvious manner to provide a completed cable splice of the type illustrated in FIG. 8.

While only a preferred embodiment for the practice of the invention has been disclosed, it should be understood that numerous modifications will occur to those skilled in the art which will not depart from the spirit and scope of this invention which should be limited solely by the appended claims.

We claim:

1. Molding apparatus for applying a jacket into a cable portion comprising an elongated hollow mold member, a cylindrical cavity in said hollow mold member for receiving said cable portion, means for positioning said cable portion to extend substantially axially along the length of said cylindrical cavity, said cylindrical cavity being of a diameter substantially equal to the diameter of the jacket to be applied to the cable portion, heating means for heating said mold member, inlet means communicating with said cylindrical cavity, means for injecting hot liquid plastic into said inlet means and said cylindrical cavity at a pressure sufficient to cause said hot liquid plastic to flow into the interstices of the cable portion and bleed apertures communicating with said cavity for venting said cavity.

2. The invention of claim 1 wherein said hollow mold member is formed of a base block having a top block pivotally connected to said base block with half of said cylindrical cavity formed in the base block and the other half of said cylindrical cavity formed in the top block.

3. The invention of claim 2 wherein said base block and said top block each includes electrical heating elements.

4. The invention of claim 3 wherein said base block includes liquid receiving cooling conduits.

5. The invention of claim 1 wherein said means for injecting hot liquid plastic into said inlet means and said cylindrical cavity comprises extrusion pump means and wherein said bleed apertures are provided adjacent each end of said cylindrical cavity.

6. The invention of claim 5 wherein said means for positioning said cable portion includes means for holding said cable portion in tensioned condition along the length of said cylindrical cavity.

7. The invention of claim 6 wherein said hollow mold member is formed of a base block having a top block pivotally connected to said base block with half of said cylindrical cavity formed in the base block and the other half of said cylindrical cavity formed in the top block.

8. The invention of claim 7 wherein said heating means includes electrical heating elements in said base block and said top block.

9. The invention of claim 8 wherein said base block also includes liquid receiving cooling conduits.

10. The invention of claim 1 wherein said means for positioning said cable portion includes means for holding said cable portion in tensioned condition along the length of said cylindrical cavity.

* * * * *